April 9, 1957        E. L. SCHULMAN        2,788,052
ELECTRICAL INSULATION SUITABLE FOR COMMUTATORS
Filed Aug. 19, 1954

WITNESSES

INVENTOR
Earl L. Schulman
BY
ATTORNEY

United States Patent Office 2,788,052
Patented Apr. 9, 1957

2,788,052

ELECTRICAL INSULATION SUITABLE FOR COMMUTATORS

Earl L. Schulman, Pittsburgh, Pa., assignor to Westinghouse Electric Corporation, East Pittsburgh, Pa., a corporation of Pennsylvania Application August 19, 1954, Serial No. 450,902

7 Claims. (Cl. 154—2.6)

This invention relates to thin laminated sheet electrical insulating material particularly suited for use in commutators of electric generators and motors.

The requirements of electrical insulation for use in conjunction with apparatus such as commutators impose a severe standard. Few solid materials have been found suitable for this purpose. In the past, the material generally finding most extensive use has been produced by combining mica flakes with some binder, usually shellac. Also finding use has been an asbestos paper laminate impregnated with a suitable resin binder. A difficulty with these materials has been their inherent brittleness with breakage occurring during the manufacture of the commutator. Breakage has been particularly prevalent in the assembly of commutators having neck extensions. Also, some automatic stacking machines break the thin electrical sheet during the insulation inserting operation.

An object of this invention is to provide thin laminated sheet electrical insulating material having a high strength and resistance to cracking and breaking comprising a center sheet of glass cloth bounded on each side by a surface sheet of asbestos paper impregnated with a polyester resin.

A further object of this invention is to provide a method of molding a thin laminated sheet of electrical insulating material having high strength and resistance to cracking and breaking from glass cloth and asbestos paper, the asbestos paper being impregnated to a critical resin ratio with a polyester resin.

Other objects of the invention will, in part, be obvious and will, in part, appear hereinafter.

For a fuller understanding of the nature and objects of the invention, reference should be had to the following drawing in which.

Figure 1:
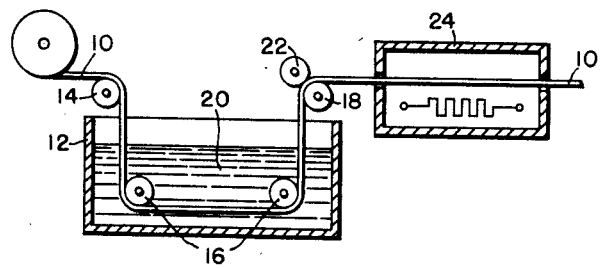
Figure 1 is a schematic view of the resin impregnation of the fibrous material used in practicing this invention.

I have discovered a thin laminated sheet of electrical insulating material which has a high strength and resistance to cracking and breaking which comprises a center sheet of open weave glass fiber cloth and a coextensive surface sheet of asbestos paper bonded to each face of the center sheet. These sheets are impregnated with a particular resinous binder, to be hereinafter described, and molded together under heat and pressure to form a consolidated sheet having a thickness of from 0.020 to 0.050 inch.

The asbestos paper used for the surface sheets has a thickness of from 0.025 to 0.035 inch. The paper is impregnated to a resin ratio of from 1.3 to 1.7. The glass cloth used for the center of the laminate has a thickness of from 0.003 to 0.010 inch, and may or may not be impregnated at the discretion of the laminator. If the glass cloth is impregnated, the resin ratio is from 1.05 to 1.15. It is important that the resin ratio for the glass cloth be kept low, or otherwise the finished product will not possess the desired high strength properties. Resin ratio as used herein is defined as the weight of the untreated sheet plus the weight of the resin applied thereto divided by the weight of the untreated sheet.

The glass cloth is of open weave and has an average of 16 openings per linear inch. However, glass cloth with 10 to 30 openings per inch may be employed. Excellent results are obtained if the glass cloth is pretreated with a stable 15% colloidal dispersion of silica and water and dried. The silica treatment improves the handling characteristics of the glass cloth. It is to be understood of course that the silica treatment is carried out prior to any resin impregnation of the cloth. A suitable silica treatment for the glass cloth which is well known to the trade is Syton by Monsanto Chemical Company.

The organic resin which is used in treating the asbestos and glass cloth in the practice of this invention is produced by combining styrene or a simple substituted styrene with the unsaturated polyester reaction product of an alpha-beta unsaturated dicarboxylic acid and a dihydric alcohol. As an example of the preparation of the polyester resin, one mol of maleic anhydride is esterified with one mol, within plus or minus 2%, of a glycol, such as diethylene glycol.

The reaction of the maleic anhydride and diethylene glycol is preferably carried out in an enclosed reaction vessel embodying a stirrer and a condensing column. The reaction vessel is heated to a temperature of about 250° C. in order to cause the esterification of the diethylene glycol and the maleic anhydride. While temperatures of about 200° C. may be employed, the time of reaction will be longer. In some cases, catalysts such as para toluene sulphonic acid may be introduced into the reaction vessel, but a catalyst is not necessary. A non-reactive gas, for example, nitrogen, is continually bubbled through the reactants at a rate of 0.5 cubic foot per minute. The water evolved during the esterification is removed by the inert gas, condensed in the column attached to the vessel and then may be removed from the vessel.

A suitable time of reaction is from 8 to 16 hours. For the purpose of this invention, a polyester having an acid number of from 60 to 65 is desirable since the cured final resin will then be of a suitable toughness without being too hard. A good test for determining whether the esterification reaction is satisfactory for the practice of the invention is to test a sample of the polyester by the ball and ring test—resins having a ball and ring softening temperature of from 60° to 70° C. being satisfactory. The polyester, when at the desired acid number and ball and ring value, is allowed to cool to room temperature, or slightly higher, before further processing.

To the polyester resin so prepared, about 0.1% of an inhibitor such as quinhydrone, is added in order to increase the storage life at room temperature as well as to secure a predetermined rate of solidification of the resin during subsequent molding operations. In some cases, organic copper salt inhibitors may be introduced.

To the polyester prepared in the above manner, there is added from 25 to 60 parts by weight of styrene for each 100 parts thereof, the two forming a solution. A varnish suitable for impregnating the asbestos paper and glass cloth is prepared by admixing from 50% to 65% by weight of the ester and styrene solution with from 35% to 50% by weight of a volatile solvent or diluent, or mixtures of two or more. Suitable solvents and diluents are, for example, benzene, toluene, acetone, methylethyl ketones or higher ketones, or mixtures thereof.

Prior to using the varnish, from about 0.5% to 2% of benzoyl peroxide, t-butyl perbenzoate ascaridol or some other organic peroxide polymerization catalyst is added to the solution. The ratio of the inhibitor to the catalyst determines the tank life, the rate of setup of the resin, as well as the time and temperature required in the final heat treatment. A ratio of one part of inhibitor to from 4 to 30 parts of catalyst has given excellent results.

Many dihydric alcohols, such for example as diethylene glycol, ethylene glycol, propylene glycol, butylene glycol or polyethylene glycols may be employed in producing a suitable ester. Mixtures of glycols are contemplated in the practice of the invention. In all cases, the amount of glycol per mol of unsaturated dicarboxylic acid should be maintained within 2%. Maleic anhydride has been found to give excellent results in the practice of this invention. In some cases, maleic acid, fumaric acid, citraconic acid or citraconic anhydride may be employed to replace a part or all of the maleic anhydride with good results. Styrene may be replaced in the formulation by $\alpha$-methyl-p-methyl styrene, vinyl carbazole, vinyl acetate, ethylene dichloride ($CH_2=CCl_2$), or any other monomer containing the reactive grouping $>C=C<$.

Illustrated in Fig. 1 of the drawing is the impregnation of a fibrous material with the varnish prepared as described above. A fibrous material 10, either the asbestos paper or glass cloth, is drawn into the treating tank 12 over rollers 14, 16 and 18 for impregnation by the varnish 20. An adjustable pressure roller 22 may be employed in combination with roller 18 in order to remove excess solution by squeezing the sheet. In some cases the paper or cloth may be dipped in the solution and allowed to drain in a vertical position.

The saturated porous fibrous material 10 is dried at temperatures of from 60° C. to 80° C. for 10 minutes in oven 24 in order to remove the solvent without causing the styrene to react with the maleic anhydride-glycol ester. After passing through the oven 24, the dry impregnated sheets 10 may be cut to any predetermined size without any difficulty in handling. The sheet material may be stored in closed containers at room temperature for reasonable periods of time without untoward changes in the nature of the resin present therein.

Figure 2:
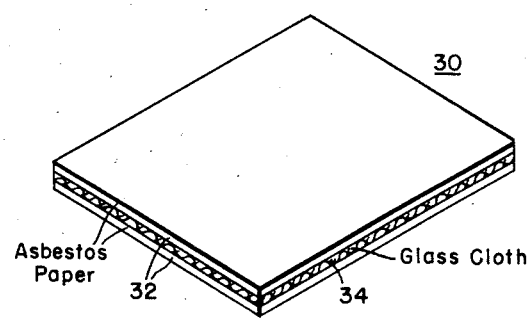
Fig. 2 is a perspective view of a solid insulating sheet prepared according to the invention.

Illustrated in Fig. 2 of the drawing is a molded laminated sheet 30 prepared in accordance with this invention. Two asbestos paper surface sheets 32 and a glass cloth center sheet 34 are superimposed on one another and molded in a flat press mold at pressures in the order of from 1000 to 2000 pounds per square inch at a temperature of from 125° C. to 175° C. for a period of time of from 15 to 60 minutes to produce the cured laminated sheet 30. Molding times will vary according to the temperatures and pressures used. The mold is allowed to cool to substantially room temperature before the cured sheet is removed therefrom.

Figure 3:
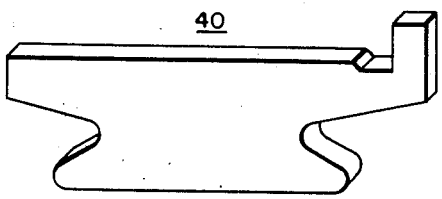
Fig. 3 is a perspective view of an inner segment commutator bar insulation.

Illustrated in Fig. 3 of the drawing is a segment insulator 40 which was produced by punching in a suitable die the sheet 30, as shown in Fig. 1. The sheet did not fracture nor chip when punched and the punchings had relatively smooth edges. The insulating segments 40 were interposed between commutator bars in the assembly of an electric motor.

A great many of these insulating segments have been produced. Their resistance to cracking and breaking during punching in the die, shipping, machine handling, etc., has been remarkable. The number requiring rejections has been negligible whereas with the segments used heretofore, there has been 20% breakage and higher.

The electrical properties of the insulation of this invention are exceptionally good. This material consistently passes a 185 second arc resistance test (ASTM). The dielectric strength of the insulation is from 480 volts per mil up to 520 volts per mil. It has been found to be effective as electrical insulation for prolonged periods of time at 150° C. without appreciable deterioration. Commutators prepared with the segments 40 have proven highly satisfactory in service.

One of the particular advantages of this invention is the great stability of the molded insulation when exposed to water or moisture. The insulation may be immersed in water for prolonged periods of time without bloating or swelling. By comparison, sheets of mica bonded with shellac usually tend to bloat and fall apart after 24 hours immersion in water.

Since certain obvious changes may be made in the above procedure and different embodiments of the invention could be made without departing from the scope thereof, it is intended that all matter contained in the above description shall be interrupted as illustrative and not in a limiting sense.

I claim as my invention:

1. A thin laminated sheet of electrical insulating material of a thickness not exceeding 0.050 inch and having a high strength and resistance to cracking and breaking, and particularly adapted for use as a commutator segment, the laminated sheet comprising a center sheet of open weave glass fiber cloth of from 0.003 to 0.015 inch thickness, a coextensive surface sheet of asbestos paper of a thickness of 0.025 to 0.035 inch bonded to each face of the center sheet, a coating of a colloidal dispersion of silica on the glass fiber cloth, the asbestos paper being impregnated to a resin ratio of from 1.3 to 1.7 with the thermoset reaction product of from 25 to 65 parts by weight of monostyrene and 100 parts of the polyester produced by reacting one mol of maleic anhydride and one mol, within 2%, of a glycol, the glass cloth and impregnated asbestos paper having been subjected to heat at temperatures of 125° C. to 175° C. and a pressure of from 1000 to 2000 pounds per square inch to produce a hard cured sheet suitable for use as commutator segment insulation.

2. The laminated sheet of claim 1 in which the glass cloth center is impregnated to a resin ratio of from 1.05 to 1.15 with the resin used to impregnate the asbestos paper.

3. A commutator segment comprising a punching of the laminated body of claim 1.

4. In the method of molding a thin laminated sheet of electrical insulating material having a high strength and resistance to cracking and breaking, the steps comprising placing in a flat press mold a center sheet of open weave glass fiber cloth of from 0.003 to 0.015 inch thickness, the glass fiber cloth having been coated with colloidal silica, and a coextensive sheet of asbestos paper of from 0.025 to 0.035 inch thickness on each side of the center sheet, the glass cloth and asbestos paper having been separately impregnated to a resin ratio of from 1.05 to 1.15 for the glass cloth and from 1.3 to 1.7 for the asbestos paper, respectively, with the thermosettable reaction products of from 25 to 65 parts by weight of monostyrene and 100 parts by weight of the polyester produced by reacting one mol of maleic anhydride and one mol within 2% of a glycol, and subjecting the sheets in the mold to temperatures of from 125° C. to 175° C. and a pressure of from 1000 to 2000 pounds per square inch for a period of time of from 15 to 60 minutes to produce a cured laminated sheet having a thickness of from 0.02 to 0.05 inch.

5. In the method of molding a thin laminated sheet of electrical insulating material having a high strength and resistance to cracking and breaking, the steps comprising placing in a flat press mold a center sheet of open weave glass fiber cloth of from 0.003 to 0.015 inch thickness, and a coextensive sheet of asbestos paper of from 0.025 to 0.035 inch thickness on each side of the center sheet, the asbestos paper having been individually impregnated to a resin ratio of from 1.3 to 1.7 with the thermosettable reaction products of from 25 to 65 parts by weight of monostyrene and 100 parts by weight of the polyester produced by reacting one mol of maleic anhydride and one mol within 2% of a glycol, and subjecting the sheets in the mold to temperatures of from 125° C. to 175°

C. and a pressure of from 1000 to 2000 pounds per square inch for a period of time of from 15 to 60 minutes to produce a cured laminated sheet having a thickness of from 0.02 to 0.05 inch.

6. The method of claim 5 in which the glass cloth has been pretreated with a colloidal dispersion of silica in water prior to applying the reaction product.

7. The method of claim 5 in which the glass cloth has been treated with a colloidal dispersion of silica in water and subsequently impregnated to a resin ratio of from 1.05 to 1.15 with the thermosettable reaction product used to impregnate the asbestos paper.

References Cited in the file of this patent

UNITED STATES PATENTS

| | | | |
|---|---|---|---|
| 2,439,953 | Swiss | Apr. 20, | 1948 |
| 2,523,022 | Horstman | Sept. 19, | 1950 |
| 2,555,506 | Powers | June 5, | 1951 |
| 2,563,288 | Steinman | Aug. 7, | 1951 |
| 2,602,037 | Nelb | July 1, | 1952 |
| 2,620,851 | Brown | Dec. 9, | 1952 |
| 2,627,297 | Faelten | Feb. 3, | 1953 |
| 2,649,396 | Witt et al. | Aug. 18, | 1953 |
| 2,660,215 | Arone | Nov. 24, | 1953 |